United States Patent [19]
Hikmet

[11] Patent Number: 5,900,977
[45] Date of Patent: May 4, 1999

[54] POLARIZING ELEMENT INCLUDING LAYER HAVING ALTERNATING AREAS OF BIREFRINGENT AND ISOTROPIC MATERIALS

[75] Inventor: Rifat A. M. Hikmet, Eindhoven, Netherlands

[73] Assignee: U.S. Philips Corporation, New York, N.Y.

[21] Appl. No.: 08/669,068

[22] Filed: Jun. 24, 1996

[30] Foreign Application Priority Data

Jun. 29, 1995 [EP] European Pat. Off. .............. 95201770

[51] Int. Cl.⁶ ...................................... G02B 5/30
[52] U.S. Cl. ..................... 359/497; 359/487; 359/495; 349/96
[58] Field of Search ..................... 359/487, 488, 359/494, 495, 497; 349/5, 96

[56] References Cited

U.S. PATENT DOCUMENTS

| | | |
|---|---|---|
| 4,613,207 | 9/1986 | Fergason . |
| 4,733,941 | 3/1988 | Broer et al. . |
| 5,134,516 | 7/1992 | Lehureau et al. ................. 359/495 |
| 5,188,760 | 2/1993 | Hikmet et al. . |
| 5,440,424 | 8/1995 | Wu et al. ................. 359/495 |
| 5,570,209 | 10/1996 | Usui et al. ................. 349/5 |

FOREIGN PATENT DOCUMENTS

| | | |
|---|---|---|
| 0213680 | 3/1987 | European Pat. Off. . |
| 0451905 | 10/1991 | European Pat. Off. . |
| 0451905 A1 | 10/1991 | European Pat. Off. ........ C09K 1/133 |
| 2-828 | 1/1990 | Japan ...................... 349/96 |
| 3-233405 | 10/1991 | Japan ...................... 359/488 |
| 2166562 | 5/1986 | United Kingdom ............ G02F 1/133 |

*Primary Examiner*—Cassandra C. Spyrou
*Assistant Examiner*—Darren E. Schuberg
*Attorney, Agent, or Firm*—F. Brice Faller

[57] ABSTRACT

Polarizing element having a first layer and a second layer. When an unpolarized light beam is incident on the element, the direction of at least one of the polarization components of the unpolarized beam will be influenced by the first layer. These polarization components have different directions of polarization. The second layer influences the direction of a polarized beam incident thereon. A polarization-rotating layer is present between the first layer and the second layer. An unpolarized beam can be substantially completely converted into a polarized beam having mainly the same direction of polarization.

22 Claims, 5 Drawing Sheets

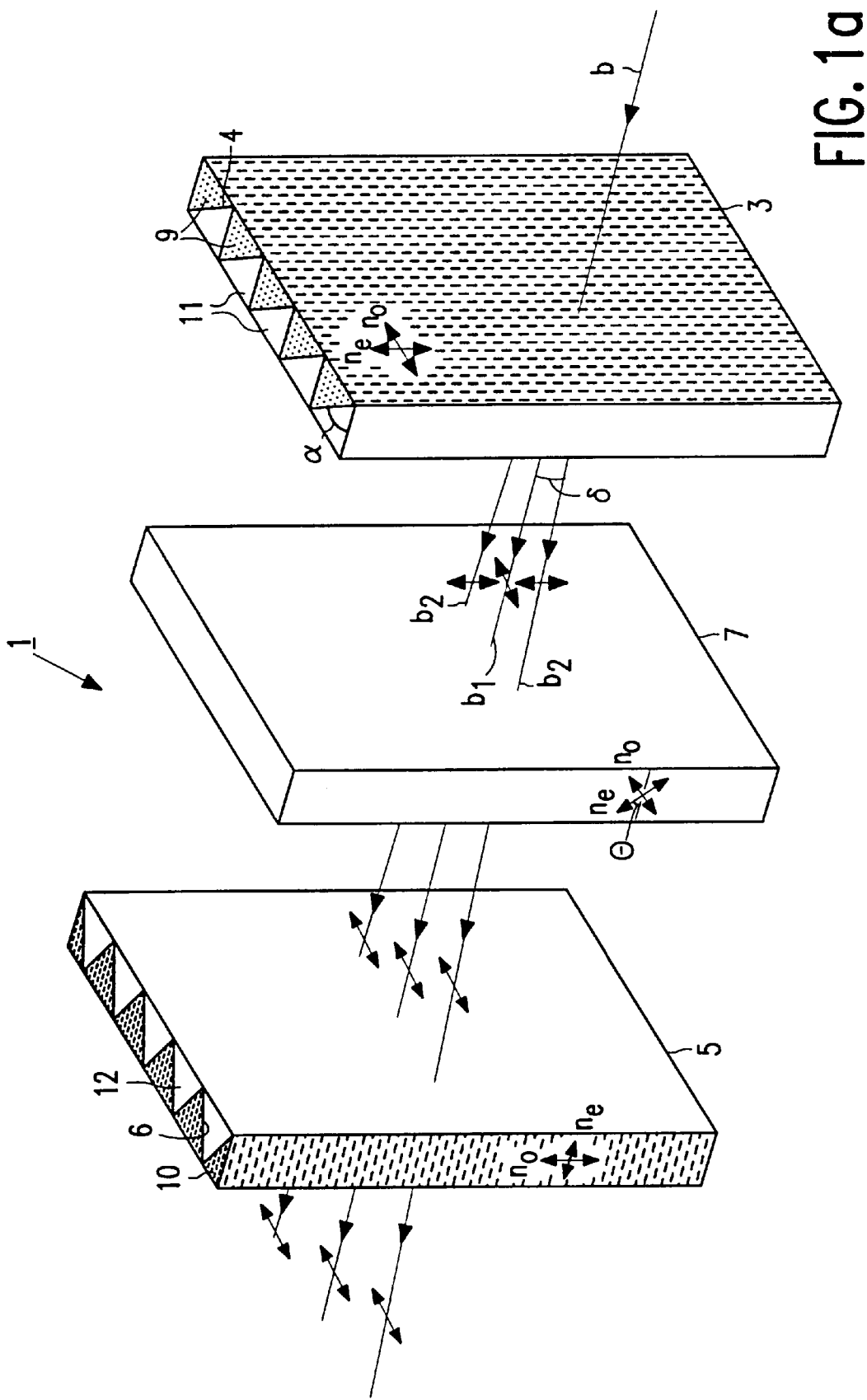

POLARIZING ELEMENT INCLUDING LAYER HAVING ALTERNATING AREAS OF BIREFRINGENT AND ISOTROPIC MATERIALS

BACKGROUND OF THE INVENTION

The invention relates to a polarizing element having a first layer for influencing the direction of at least one of the polarization components of an unpolarized beam incident on the element, which components have different directions of polarization.

The invention also relates to an image projection device in which at least one of the polarizers surrounding the image display panel is implemented as the first or the second layer of a polarizing element in accordance with the invention, and to an image projection device in which the first polarizer or the image display panel, together with the polarizer and the analyzer, is implemented as a polarizing element in accordance with the invention.

To polarize an unpolarized beam, use may be made of all kinds of polarizers. One of the best known types is an absorbing polarizer which absorbs the unwanted direction of polarization. A drawback of such a polarizer is that approximately 50% of the intensity of the unpolarized beam is lost. Moreover, when a high-power radiation source is used, for example in image projection devices, the polarizer may be considerably heated, which may be harmful for the material from which the polarizer is made and will lead to degradation of the polarizer. To eliminate the harmful effect of this heating as much as possible, expensive cooling systems are to be provided which also detrimentally influence the compactness of the device.

Another type of polarizer is a polarizing element of the type described in the opening paragraph and is known, for example from British Patent Application GB 2 166 562. The polarizing element described in this Application consists of a layer in which areas comprising a liquid crystalline material and areas comprising a transparent isotropic material alternate with each other in a direction located in the plane of the layer. The structure thus formed may be considered as a diffraction grating. The major axis of the molecules of the liquid crystalline material is directed parallel to the grooves of the diffraction grating. By providing electrodes on the substrates between which the diffraction grating is formed, the orientation of the liquid crystalline molecules, and hence the direction of the diffraction to which light incident on the element is subjected, may be changed. Such a polarizer passes the desired direction of polarization and refracts the unwanted direction of polarization from the light path.

The risk of damage of this type of polarizer is much smaller because the unwanted light is no longer absorbed by the polarizer. However, such a polarizer still has the drawback that substantially half the intensity of an unpolarized beam incident on the element is lost because the unwanted direction of polarization is refracted from the original beam. When such an element is used as a polarizer in a device in which a high brightness of the images is desirable, as in, for example an image projection device, the use of a high-power light source is still desirable. However, such a light source consumes a relatively large amount of current and dissipates relatively much heat in the device so that cooling measures are still to be taken.

SUMMARY OF THE INVENTION

It is an object of the present invention to provide a polarizing element in which the greater part of the unpolarized light beam is converted into light having the suitable direction of polarization, while the risk of damage of the element due to heat is relatively small and the cooling does not require any special attention, which element is, moreover, very flat so that a device in which the element is used can be implemented in a much more compact way.

To this end, the polarizing element in accordance with the invention is characterized in that the element further has a second layer which influences the direction of at least one polarized beam incident thereon, and a polarization-rotating layer which is present in at least the light path of said polarized beam.

An unpolarized beam is split up by the first layer into two beam components having mutually different directions of polarization, which will propagate in different directions. The axes of the beam components will therefore undergo a slight divergence.

The second layer ensures that this divergence is reduced again so as to cause a maximal amount of light to fall within the aperture of optical components arranged behind the element.

In the polarization-rotating layer, the phase of at least one beam component is retarded so that the direction of polarization of the relevant component will be rotated through a given angle. If the unpolarized beam is split up by the first layer into two mutually perpendicularly polarized beam components, and if one of these two components is rotated through an angle of 90°, beam components passed by the polarization-rotating layer will substantially have the same direction of polarization.

Since none of the three components of the polarizing element absorbs a noticeable quantity of light, there is substantially no risk of damage due to heat and the greater part of the unpolarized beam is converted into a polarized beam having the same direction of polarization. Consequently, the light source used need not have any extra high power and the cooling does not require any special attention.

A first embodiment of the polarizing element in accordance with the invention is characterized in that the polarization-rotating layer is present between the first and the second layer.

The first layer splits up the unpolarized beam into two polarization components which will propagate in different directions. Both polarization components are incident on the polarization-rotating layer which ensures that the components leaving this layer substantially have the same direction of polarization. Subsequently, the beam is converged by the second layer.

A further embodiment of the polarizing element according to the invention is characterized in that the first and the second layer are implemented as a succession of first and second areas which alternate with each other in a direction located in the plane of said layers, and in which one of the areas comprises a birefringent material having refractive indices $n_o$ and $n_e$ and the other area comprises an isotropic material having a refractive index $n_p$, in which $n_o=n_p$ or $n_e=n_p$.

The direction of polarization of the beam components jointly constituting the light beam which is incident on the interface between the first and the second areas of the first layer can be influenced by choosing a birefringent material for the material of the first or the second areas, of which one of the refractive indices $n_o$ or $n_e$ is equal to the refractive index $n_p$ of the isotropic material in the contiguous area. If, for example $n_o=n_p$, the ordinary beam component will not detect any difference in refractive index at the interface between a first and a second area and will consequently be passed unrefracted, whereas the beam component having a direction of polarization perpendicular to that of the transmitted beam component, in other words the extraordinary beam component, will be refracted. The angle through which refraction takes place is determined by the difference between the refractive indices of the material of the first and the second area and the angle at which the radiation to be polarized is incident on the interface. If $n_e = n_p$, the extraordinary beam component will be passed by the relevant layer without being refracted, whereas the ordinary beam will be refracted.

The angle enclosed between the original direction of propagation of the incident beam and the direction of refraction is given by $$\gamma = \text{acos}\ (n_e/(n_p \cos \alpha)) + \alpha - 90°$$

Here, $\alpha$ is the angle enclosed between the normal on the first layer and the interface between a first and a second area in this layer.

Refraction occurs in a comparable manner at the interface between the first and the second areas of the second layer. The first and the second areas are chosen to be such that the beam component rotated by the polarization-rotating layer in the direction of polarization is refracted by the second layer towards the unrefracted beam component.

The polarization-rotating layer acts on only one of the polarization components in this case. The other component is passed without being refracted.

A further embodiment of the polarizing element in accordance with the invention is characterized in that $n_{o,1} = n_{p,1}$ holds for the first layer, and in that a major axis of the molecules of the first layer is located in the plane of the first layer and parallel to the longitudinal direction of the first and the second areas.

A further embodiment of the polarizing element in accordance with the invention is characterized in that $n_{o,2} = n_{p,2}$ holds for the second layer, and in that a major axis of the molecules of the second layer is located perpendicularly to the plane of the second layer.

If $n_p = n_o$ in combination with the above-described orientation of the molecules in the first and the second layer, it is achieved that the ordinary rays are passed, whereas the extraordinary rays are refracted.

If $n_p = n_e$ and if the major axes of the molecules in the first and the second layer are located perpendicularly to the afore-mentioned orientations, the extraordinary rays will be passed and the ordinary rays will be refracted by the first and the second layer.

A further embodiment of the polarizing element according to the invention is characterized in that the polarization-rotating layer comprises uniaxially oriented molecules, in which the projection, on the first layer, of the axis along which the molecules are oriented in the polarization-rotating layer is substantially parallel to a major axis of the molecules of the first layer.

The polarization-rotating layer is implemented in such a way that the polarization component which is perpendicularly incident maintains its direction of polarization, and that the direction of polarization of the polarization component incident at an angle which is not perpendicular is rotated.

This is achieved by locating the axis of the uniaxially oriented molecules in a plane enclosing an angle θ with the normal on the layer. The projection of the axis along which the molecules of the polarization-rotating layer are oriented then coincides with the orientation of the major axis of the molecules in the first layer. The radiation which is not perpendicularly incident is refracted at an angle γ with respect to the direction of incidence. The values of the angle θ, the thickness d and the difference of refractive index of the material of the polarization-rotating layer are determined by the angle γ. These three parameters define the angle through which the direction of polarization of the relevant polarization component is rotated. A rotation of 90° can be obtained by optimizing these parameters.

Another embodiment of the polarizing element according to the invention is characterized in that the polarization-rotating layer comprises uniaxially oriented molecules, and in that the orientation axis of these molecules is located in the plane of the layer, the layer being tilted with respect to the first layer through an angle at which the projection of the axis of the uniaxial molecules on the first layer is substantially parallel to a major axis of the molecules of the first layer.

Instead of orienting the uniaxial molecules in accordance with an axis enclosing an angle θ with the normal on the layer, the molecules may be located in the plane of the layer, whereas the layer itself may be tilted through an angle θ.

A particular embodiment of the polarizing element in accordance with the invention is characterized in that the polarization-rotating layer is a liquid crystalline layer which is divided in the form of a matrix into cells which can be driven independently and thus constitutes an image display panel.

The directions of the extraordinary and the ordinary radiation beams are separated from each other by the first layer. By providing an electric field across the pixels of the liquid crystalline matrix, it can be ensured that per pixel the two polarization components each maintain their direction of polarization. Subsequently, each polarization component is incident on the second layer which will pass one of the two components unhindered and influence the other in its direction in order to converge the beam component axes. The result is a pixel beam consisting of two separated polarization components which are substantially parallel to each other.

If no electric field is provided across the pixels of the liquid crystalline matrix, the two polarization components in which the first layer has split up the unpolarized beam will each undergo a rotation of 90° in their direction of polarization at the location of said pixels and again constitute two mutually perpendicularly polarized components which will even be further refracted by the second layer. Now, two polarization components are produced whose directions enclose an angle of more than 0°.

Another embodiment of the polarizing element in accordance with the invention is characterized in that the second layer is a refractive layer which is polarization-insensitive.

An unpolarized beam is split up by the first layer into two mutually perpendicularly polarized beam components. Upon leaving the first layer, these two beam components enclose an angle. The light path of one of these beams accommodates the second layer which, independent of the direction of polarization of the polarization component incident thereon, refracts this beam component in a direction substantially parallel to the beam component which was passed unhindered by the first layer. Subsequently, a polarization-rotating element is provided in the light path of this refracted beam component or in the light path of the unrefracted beam component so as to render the direction of polarization of the two beam components equal to each other. In this way, a substantially parallel beam having mainly the same direction of polarization is obtained.

The order of the polarization-rotating element and the second layer may also be interchanged because the refraction by the second layer is independent of polarization.

Another embodiment of the polarizing element in accordance with the invention, which may realise a split up of the polarization components as described in the foregoing embodiment, is characterized in that the first layer is implemented as a succession of first and second areas which alternate with each other in a direction located in the plane of said layer, and in which one of the areas comprises a birefringent material having refractive indices $n_o$ and $n_e$ and the other area comprises an isotropic material having a refractive index $n_p$, in which $n_o=n_p$ or $n_e=n_p$, and in that the second layer comprises an isotropic material.

BRIEF DESCRIPTION OF THE DRAWINGS

These and other aspects of the invention will be apparent from and elucidated with reference to the embodiments described hereinafter in conjunction with the drawings, in which:

FIGS. 1a and 1b are perspective views of embodiments of the polarizing element in accordance with the invention;

DESCRIPTION OF THE PREFERRED EMBODIMENTS

Figure 1B:
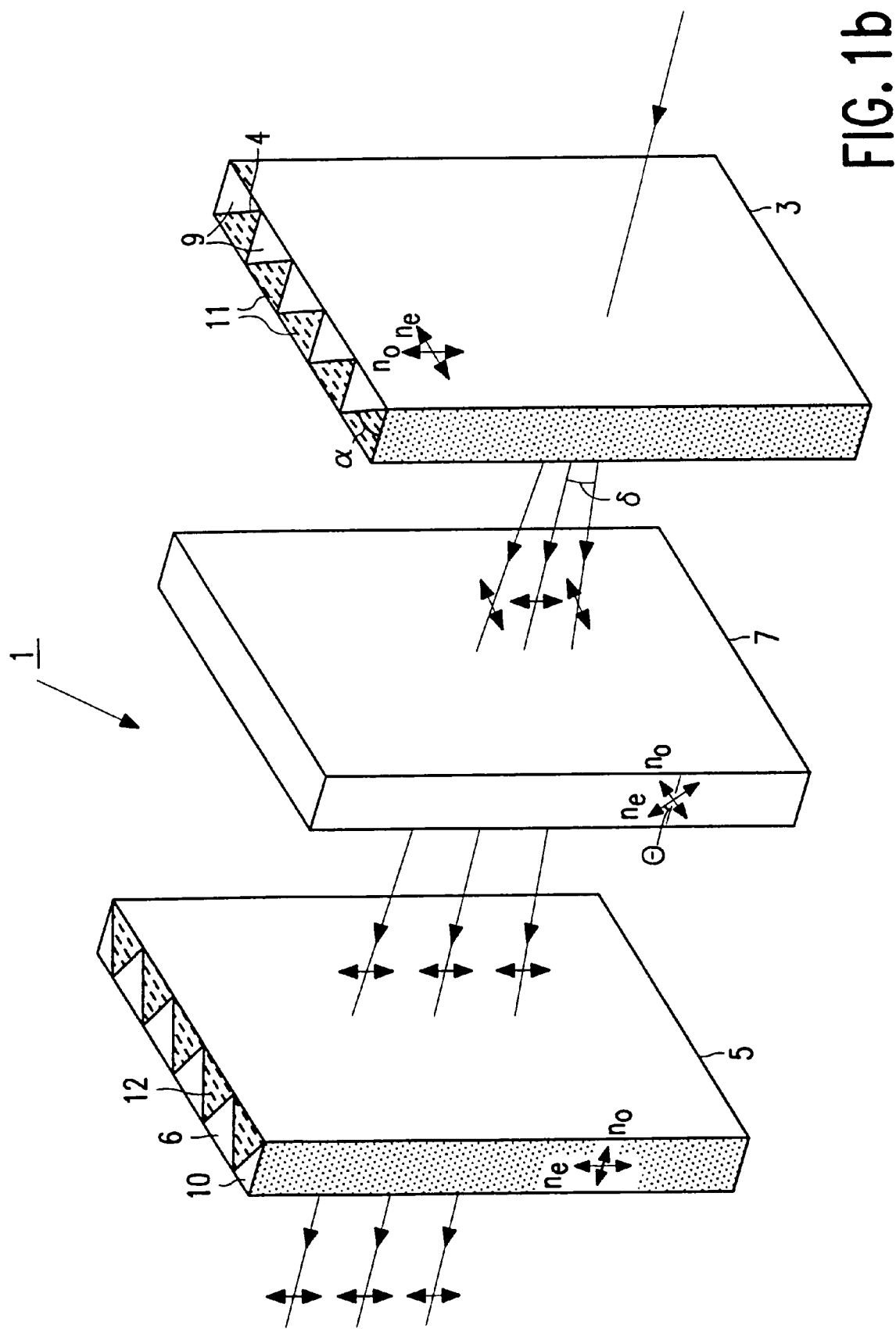

The polarizing element 1 shown in FIG. 1a has a first layer 3 and a second layer 5. The first layer 3 influences the direction of one of the beam components which jointly constitute an unpolarized beam b incident on the element 1, and the second layer 5 influences the direction of polarized components incident on this layer, dependent on their direction of polarization. Moreover, a polarization-rotating layer 7 is present between the first layer 3 and the second layer 5.

The first layer 3 comprises elongate first areas 9 and second areas 11 which are aligned in a longitudinal direction and which succeed each other in a lateral direction which is in the plane of the layer and substantially perpendicular to the longitudinal direction. One of the two areas, for example the first area 9, comprises a birefringent material having an ordinary refractive index $n_{o,1}$ and an extraordinary refractive index $n_{e,1}$. The second area 11 then comprises an isotropic material having a refractive index $n_{p,1}$. When an unpolarized beam b is incident on the first layer 3, the ordinary rays will detect no difference in refractive index, if $n_{o,1}=n_{p,1}$, at the interface 4 between the first and the second areas and will consequently be passed unrefracted. These rays jointly constitute a first beam component $b_1$. However, the extraordinary rays will experience a difference in refractive index because $n_{e,1} \neq n_{p,1}$ and will subsequently be refracted with respect to the ordinary rays. These rays jointly constitute a beam component $b_2$. Only the chief rays of the beam components are shown. The angle enclosed by the direction of refraction with the direction of incidence on the first layer is given by $\gamma = \mathrm{acos}\,(n_{e,1}/(n_{p,1}\cos\alpha)) + \alpha - 90°$ in which $\alpha$ is the angle which is enclosed between the normal on the first layer and the interface 4 between a first and a second area of this layer.

The beam b which is now split up into two beam components $b_1$, $b_2$ having mutually perpendicular directions of polarization, indicated by means of double arrows through the chief rays, is subsequently incident on a polarization-rotating layer 7. This layer 7 comprises uniaxially oriented molecules. The angle through which the direction of polarization of a given beam component is rotated is determined by the direction of the axis along which the molecules in the layer 7 are oriented with respect to the normal on the layer (angle θ), by the thickness of the layer 7 and by the refractive index difference Δn in this layer. If the two beam components $b_1$, $b_2$ are mutually perpendicular polarized and the polarization-rotating layer causes a rotation through 90° of the beam which is not perpendicularly incident thereon, the beam components will mainly have the same direction of polarization after passage through the polarization-rotating element. However, the axes of the beam components will still diverge. By causing these beam components to be subsequently incident on the second layer 5, which in principle is of the same type as the first layer 3, the divergence can be reduced so that the total aperture of the beam decreases. To this end, the second layer 5 also consists of first areas 10 and second areas 12. The first areas 10 comprise, for example a birefringent material having indices $n_{o,2}$ and $n_{e,2}$, and the second areas 12 comprise an isotropic material having a refractive index $n_{p,2}$. The birefringent material may be the same for the first and the second layer, but it may also be different. For $n_{o,2}=n_{p,2}$ it holds again that the ordinary rays at the interface 6 do not experience any difference in refractive index and are thus passed unrefracted, whereas the extraordinary rays are refracted. By orienting the major axis of the molecules perpendicularly to the plane of the layer in this layer, the extraordinary rays will be refracted in the direction of the ordinary rays, in other words, the beam component axes will be converged.

If in the first layer 3 $n_p=n_o$ and the major axis of the molecules of the birefringent material of the first layer 3 is located in the plane of this first layer 3 and is parallel to the longitudinal direction of the areas 9, 11, and if in the second layer 5 $n_p=n_o$ and the major axis of the molecules of the birefringent material of the second layer 5 is perpendicular to the plane of this second layer, the two layers 3, 5 will pass the ordinary rays and refract the extraordinary rays. This embodiment is illustrated in FIG. 1a.

If $n_p=n_e$ and the major axis of the molecules of the birefringent material of the first layer 3 is located in the plane of this first layer 3 but is perpendicular to the longitudinal direction of the grooves, and if $n_p=n_e$ for the second layer 5 and the major axis of the molecules is located in the plane of this layer and is perpendicular to the longitudinal direction of the areas 9, 11, the extraordinary rays will be passed by both layers, whereas the ordinary rays will be refracted. This embodiment is shown in FIG. 1b.

The possibilities of combination of first and second layers are not limited to the embodiments described above. The embodiments described are, however, relatively easy to manufacture. For the first layer 3 it may hold that $n_p=n_o$, while for the second layer 5 it may hold that $n_p=n_e$, or conversely.

In order that the polarization-rotating layer 7 rotates the direction of polarization of the beam incident thereon at an angle, the projection of the axis along which the uniaxially oriented molecules of the polarization-rotating layer 7 are located should coincide with the orientation of the major axes of the molecules of the birefringent material of the first layer 3.

The refractive indices $n_o$ and $n_e$ and the angle $\alpha$ of the first layer 3 determine the angle $\delta$ which is enclosed by the refracted polarization component $b_2$ with the on-going polarization component $b_1$. With reference to the value for $\gamma$, the angle $\theta$, the thickness d and the required refractive index difference $\Delta n$ of the polarization-rotating layer 7 are determined. By optimizing these parameters, it can be achieved that one of the polarization components is passed without its direction of polarization being influenced, whereas the direction of polarization of the other polarization component will be rotated through 90°.

Instead of having the axis, along which the uniaxial molecules are oriented, enclose an angle $\theta$ with the plane perpendicular to the polarization-rotating layer 7, the molecule axis may alternatively be located in the plane of the layer 7 and the layer may be tilted through an angle $\theta$.

The interfaces 4; 6 between the first and the second areas 3, 5; 10, 12 jointly constitute a surface which may have the shape of, for example a sinewave, a sawtooth, a zigzag structure or a block. A zigzag structure yields an unrefracted beam component and a refracted beam component at both sides of the on-going beam. However, a sawtooth structure is asymmetrical and yields an on-going beam and only a single refracted beam.

The first layer 3 may be made, for example by etching a monocrystalline silicon wafer or by mechanically making grooves in a substrate so as to provide the shape of the grating in the silicon or in the substrate. Subsequently, this substrate may be replicated in a birefringent material. Birefringent materials which are particularly suitable for manufacturing the above-described polarizing element by means of this technique are known anisotropic networks as described, for example in European Patent Application EP 0 213 680, to which U.S. Pat. No. 4,733,941 corresponds and anisotropic gels as described in European Patent Application EP 0 451 905 to which U.S. Pat. No. 5,188,760 corresponds. When using equally suitable LC polymers or olygomers, oriented polymers and low-mass glass-forming liquid crystalline material, the desired structure may be directly pressed into the material (embossed polymers). When using anisotropic crystals, the structure is provided mechanically.

Figure 2A:
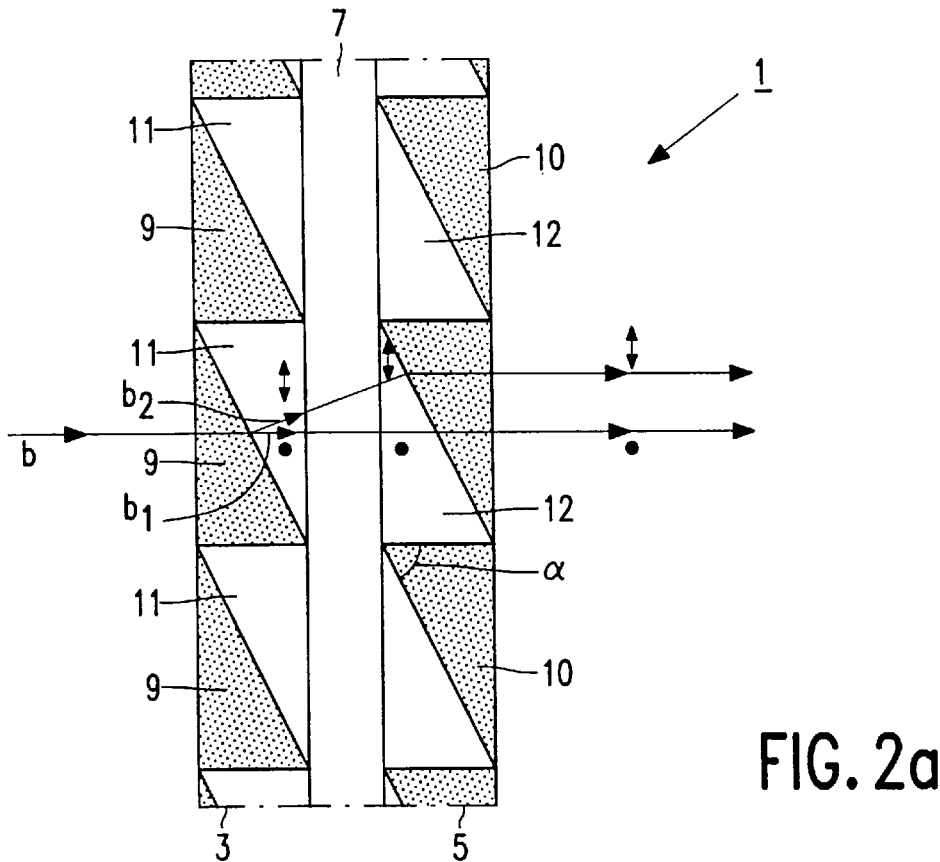
FIGS. 2a and 2b are diagrammatic representations of the radiation through the polarizing element in accordance with the invention of an unpolarized beam incident on the element for a polarization-rotating layer comprising a liquid crystalline material.
Figure 2B:
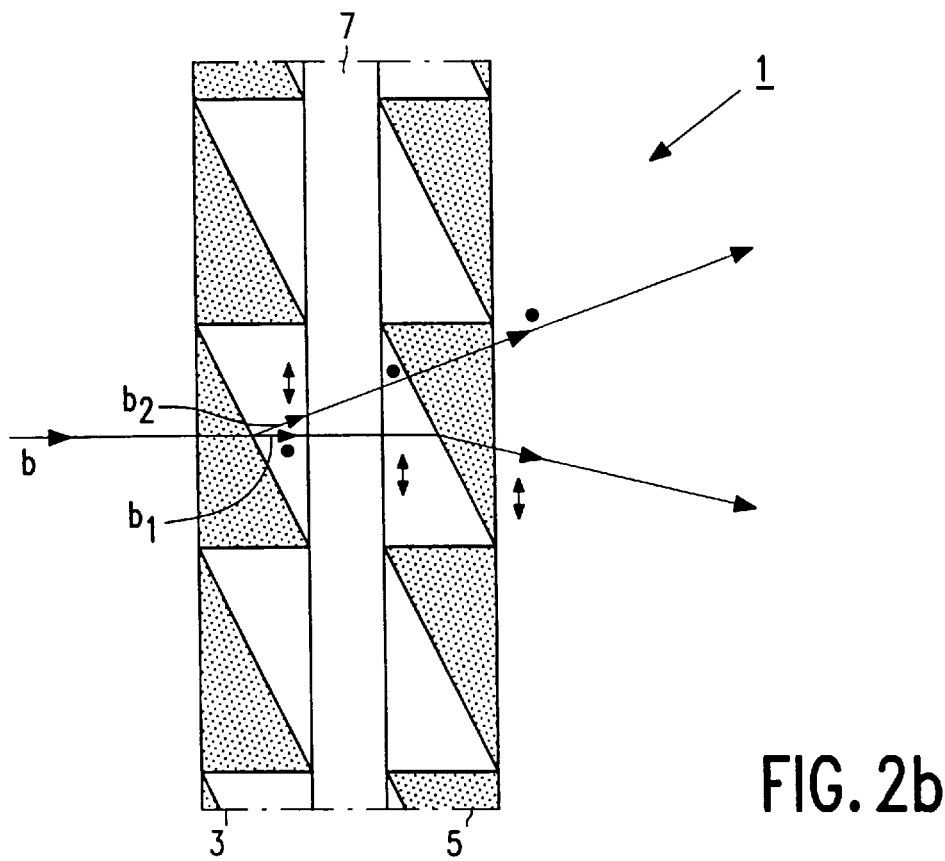

FIGS. 2a and 2b show an embodiment of a polarizing element in which the polarization-rotating layer 7 comprises a liquid crystalline material and illustrate the radiation of the ordinary and extraordinary rays for an energized cell (a) and an unenergized cell (b). The cell consists of, for example two glass plates between which the LC material is present. A transparent electrode, for example an ITO electrode, is provided on each glass plate at the side of the LC material.

A material which is based on the TN (twisted nematic) effect, the STN (super twisted nematic) effect or the ferroelectric effect may be used for the cell. Each of these materials is capable of causing a polarization rotation of 90°. The first layer 3 and the second layer 5 may be implemented as described hereinbefore.

When an unpolarized beam b is incident on the first layer 3, it will be split up into two mutually perpendicularly polarized beam components $b_1$ and $b_2$ whose directions of propagation will enclose an angle $\phi$. FIG. 2 will be explained with reference to a cell causing a rotation of polarization in the unenergized state.

When an electric field is applied across the liquid crystalline material, as shown in FIG. 2a it can be ensured that each polarization component maintains its direction of polarization upon passage through the liquid crystalline layer 7. The two different polarization components $b_1$ and $b_2$ are subsequently incident at a different angle on the second layer 5 in which one of the polarization components, for example $b_2$, is refracted in a direction parallel to that of the other polarization component $b_1$. A substantially parallel beam b' is produced which consists of two polarization components $b_1$ and $b_2$ which are separated from each other.

If there is no electric field across the liquid crystalline material, as shown in FIG. 2b the two polarization components $b_1$ and $b_2$ separated in their direction by the first layer 3 will each undergo a polarization rotation of 90°. The result is still two mutually perpendicularly polarized components. However, the direction of polarization of $b_1$ is the original direction of polarization of $b_2$, and conversely. The result is that the ordinary and the extraordinary beams $b_1$ and $b_2$ are refracted away from each other.

A polarizing element with a liquid crystalline layer as a polarization-rotating layer may be used as an image display panel. Each pixel in the liquid crystalline matrix preferably corresponds to half a period of the structure formed by the areas 9, 11; 10, 12 in the first and the second layer. By applying image information to the pixels, the angle is defined through which the direction of polarization of a polarized beam will be rotated by the polarization-rotating layer at the location of this pixel. Dependent on this angle, the refraction at the second layer of the polarizing element will differ and the unwanted radiation is reflected from the light path in a manner as described, for example in U.S. Pat. No. 4,613,207. In this way, the unwanted radiation will not reach the projection lens and grey scales can be obtained.

Figure 3:
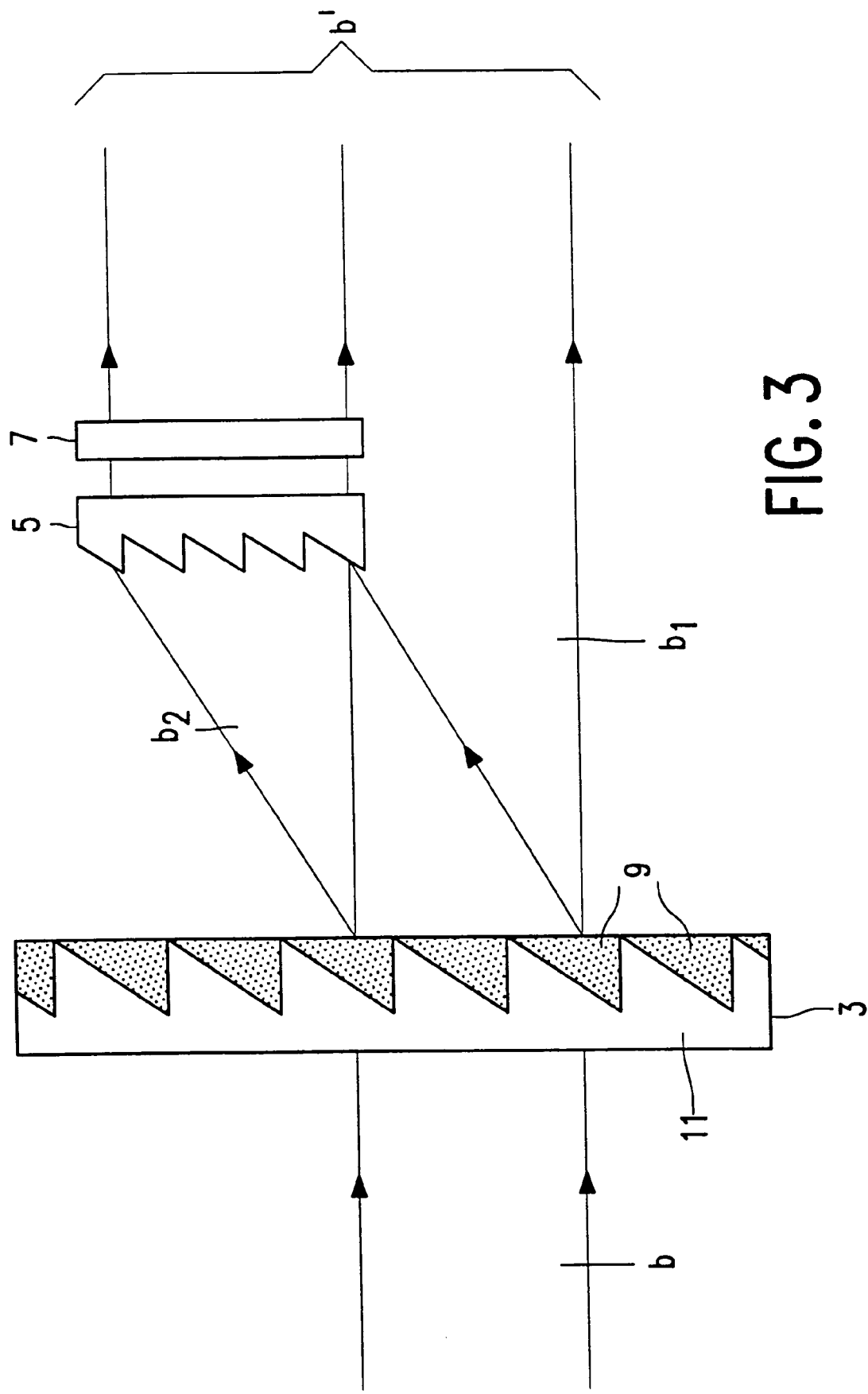
FIG. 3 is a diagrammatic representation of a polarizing element in accordance with the invention in which the second layer refracts independently of polarization.

FIG. 3 shows another embodiment of a polarizing element in accordance with the invention. The first layer 3 may be implemented similarly as the above-mentioned first layers. The second layer 5 is isotropic. The refraction of such a layer is independent of polarization so that the layer 5 may be present in front of or behind the polarization-rotating layer 7. An unpolarized beam b is incident on the first layer 3 so that the beam b is split up into two mutually perpendicularly polarized beam components $b_1$ and $b_2$. The second layer 5 renders the refracted beam $b_2$ parallel again to the other component $b_1$. A polarization-rotating layer 7 ensuring that the direction of polarization of $b_2$ is converted into that of $b_1$ is provided in the light path of $b_2$. The polarization-rotating layer may be, for example a $\lambda/2$ plate or a liquid crystalline cell which is capable of rotating the direction of polarization through 90°, in an energized or unenergized state. The result is a substantially parallel beam which mainly has the same direction of polarization.

Figure 4:
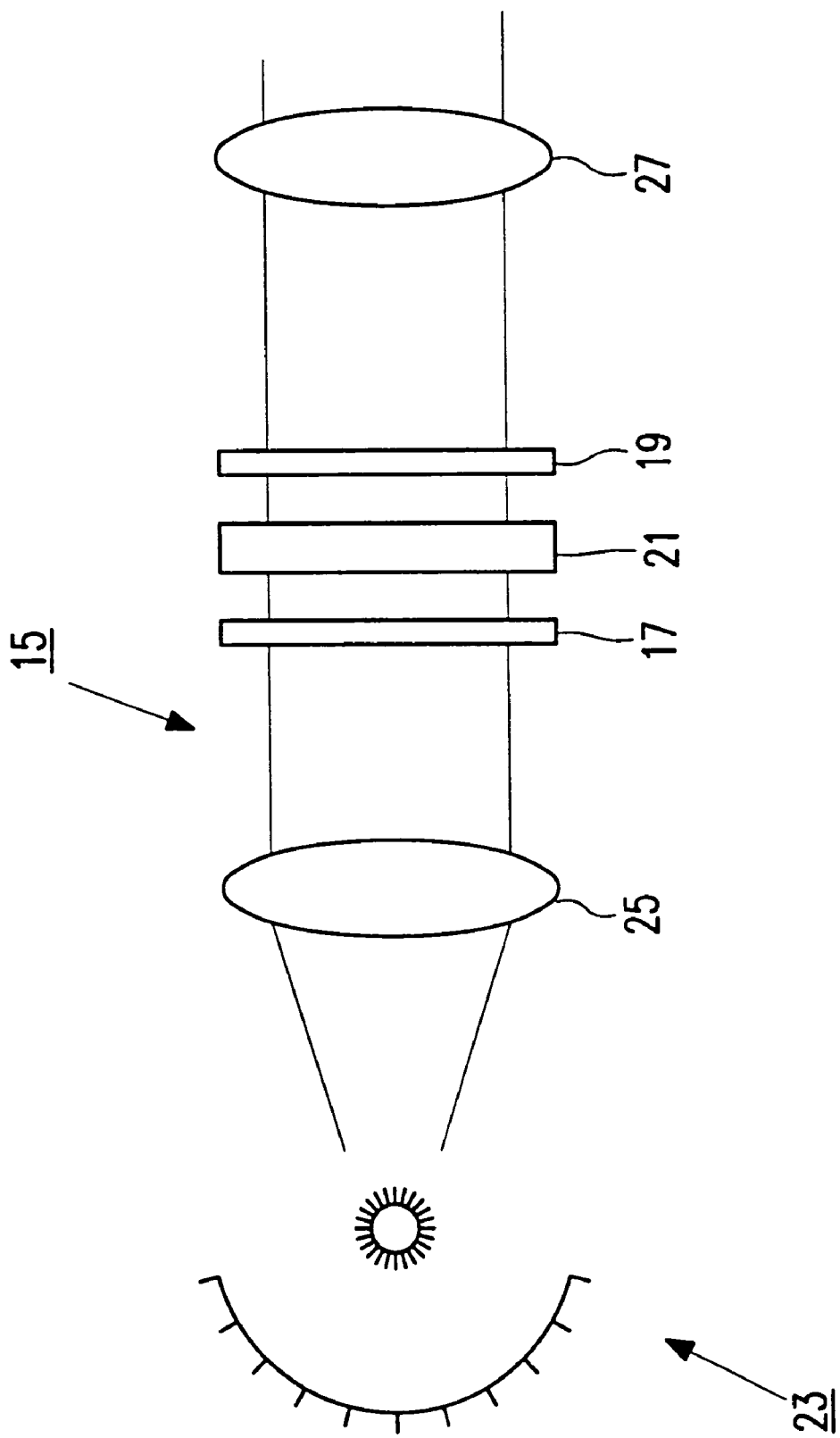
FIG. 4 is a diagrammatic representation of an image projection device in which the polarizer of the image display panel or the image display panel itself is implemented as a polarizing element in accordance with the invention.

FIG. 4 shows an image projection device 15 in which the polarizer 17 of the image display panel 21 is implemented as a polarizing element in accordance with the invention. The analyzer 19 may be implemented similarly as the first or the second layer of the polarizing element shown in FIG. 1a or 1b. Light coming from a light source 23 is incident via a condenser lens 25 on the polarizer 17 which precedes the image display panel 21. If a conventional polarizer is used, approximately 50% of the light is absorbed and only the desired direction of polarization is passed towards the image display panel 21. If the polarizer 17 is implemented as a polarizing element in accordance with the invention, the unwanted direction of polarization is no longer absorbed but first separated by refraction from the desired direction of polarization, subsequently rotated in its direction of polarization and again refracted with respect to the direction of incidence so as to cause a maximal quantity of light of the beam from the light source to be incident on the image display panel 21 in the suitable direction of polarization. The polarizing element actually functions as a prepolarizer in this case. The direction of polarization of this light beam is subsequently modulated by the image display panel 21 in accordance with the image to be displayed. The modulated beam is subsequently incident on the analyzer 19. If the analyzer is implemented similarly as the first or the second layer of the polarizing element shown in FIG. 1a or 1b, the light which does not contribute to the formation of the image will not be absorbed but will be refracted out of the light path. The light coming from the analyzer 19 goes to the projection lens system which is represented, for the sake of simplicity, by a single lens 27 by which it is converted into an image. In this way, a higher image brightness is obtained with the same light source because more light emitted by the light source is utilized for the formation of the image.

Another embodiment of an image projection device is an implementation of the combination of the image display panel with the polarizer and the analyzer in a similar way as the polarizing element, in which the polarization-rotating layer 7 is formed by a liquid crystalline layer which is divided in the form of a matrix into cells which can be separately driven and function as pixels. The polarizing element now simultaneously operates as a polarizer and a modulator.

I claim:

1. A polarizing element comprising
a first layer which splits an unpolarized light beam into two beam components having different directions of polarization, said beam components emerging from said first layer on respective paths at a positive angle with respect to each other, said first layer comprising a succession of elongate first and second areas which are aligned in a longitudinal direction and which alternate with each other in a lateral direction located in the plane of said layer, said lateral direction being substantially perpendicular to said longitudinal direction, said first area comprising a birefringent material having refractive indices $n_o$ and $n_e$, said second area comprising an isotropic material having a refractive index $n_p$, where $n_p$ is equal to one of $n_o$ and $n_e$,
a second layer which refracts one of said beam components, said second layer comprising an isotropic material which is polarization insensitive, and
a polarization-rotating layer in the path of one of said beam components.

2. A polarizing element as claimed in claim 1 wherein the polarization-rotating layer is present between the first and the second layer.

3. A polarizing element as claimed in claim 1 wherein the polarization-rotating layer is a liquid crystalline layer in the form of a matrix which is divided into cells which can be driven independently and thus constitutes an image display panel.

4. An image projection device comprising successively an illumination system for supplying a light beam, an image display panel comprising an optically active material preceded by a first polarizer and succeeded by a second polarizer, and a projection lens system, wherein the image display panel, together with the first and the second polarizer, is a polarizing element as claimed in claims 3.

5. An image projection device comprising successively an illumination system for supplying a light beam, an image display panel comprising an optically active material preceded by a first polarizer and succeeded by a second polarizer, and a projection lens system, wherein the first polarizer is a polarizing element as claimed in claim 1.

6. A polarizing element as in claim 1 wherein said polarization-rotating layer is in said path of said beam component which is refracted by said second layer.

7. A polarizing element as claimed in claim 6 wherein $n_{o,}1 = n_{p,}1$ holds for the first layer, and the first layer comprises molecules having a major axis located in the plane of the first layer and parallel to the longitudinal direction of the first and the second areas.

8. A polarizing element as in claim 6 wherein said polarization-rotating layer follows said second layer.

9. A polarizing element as claimed in claim 8, wherein the polarization-rotating layer comprises uniaxially oriented molecules, in which the projection, on the first layer, of the axis along which the molecules are oriented in the polarization-rotating layer is substantially parallel to the major axis of the molecules of the first layer.

10. A polarizing element comprising
a first layer which splits an unpolarized light beam into two beam components having different directions of polarization, said beam components emerging from said first layer on respective paths at a positive angle with respect to each other,
a second layer which refracts one of said beam components so that said paths of said components are parallel, said second layer comprising an isotropic material which is polarization insensitive, and
a polarization-rotating layer in the path of one of said beam components.

11. A polarizing element as in claim 10 wherein said first layer comprises a succession of first and second areas which alternate with each other and are oriented in a longitudinal direction located in the plane of said layer, said first area comprising a birefringent material having refractive indices $n_o$ and $n_e$, said second area comprising an isotropic material having a refractive index $n_p$, in which $n_p$ is equal to one of $n_o$ and $n_e$.

12. A polarizing element as in claim 10 wherein said polarization-rotating layer follows said second layer in said path of said beam.

13. A polarizing element comprising
a first layer which splits an unpolarized light beam into two beam components by refracting one of the two beam components under an angle different from zero with respect to the other beam component, said first layer comprising a succession of elongate first and second areas which are aligned in a longitudinal direction and which alternate with each other in a lateral direction located in the plane of said layer, said lateral direction being substantially perpendicular to said longitudinal direction, said first areas comprising a birefringent material having refractive indices $n_o$ and $n_e$, said second areas comprising an isotropic material having a refractive index $n_p$, in which $n_p$ is equal to one of $n_o$ and $n_e$,
a second layer which refracts one of said beam components towards the other beam component, and
a polarization rotating layer in the path of at least one of said beam components and acting on only one of said beam components.

14. A polarizing element as in claim 13 wherein the polarization-rotating layer is located between the first and the second layer.

15. A polarizing element as in claim 13 wherein $n_{o,1} = n_{p,1}$ holds for the first layer, and the first layer comprises molecules having a major axis located in the plane of the first layer and parallel to the longitudinal direction of the first and the second areas.

16. A polarizing element as in claim 15 wherein $n_{o,2}=n_{p,2}$ holds for the second layer, and the second layer comprises molecules having a major axis located perpendicularly to the plane of the second layer.

17. A polarizing element as in claim 13 wherein the polarization-rotating layer comprises uniaxially oriented molecules, and the orientation axis of these molecules is located in the plane of the layer, the layer being tilted with respect to the first layer through an angle at which the projection of the axis of the uniaxial molecules on the first layer is substantially parallel to a major axis of the molecules of the first layer.

18. A polarizing element as in claim 13 wherein the polarization-rotating layer is a liquid crystalline layer which is divided in the form of a matrix into cells which can be driven independently and thus constitutes an image display panel.

19. A polarizing element as in claim 13 wherein the second layer is a refractive layer which is polarization-insensitive.

20. An image projection device comprising successively an illumination system for supplying a light beam, an image display panel comprising an optically active material preceded by a first polarizer and succeeded by a second polarizer, and a projection lens system, wherein the image display panel, together with the first and the second polarizer, is implemented as a polarizing element as in claim 19.

21. An image projection device comprising successively an illumination system for supplying a light beam, an image display panel comprising an optically active material preceded by a first polarizer and succeeded by a second polarizer, and a projection lens system, wherein the first polarizer is a polarizing element as in claim 13.

22. An image project ion device comprising successively an illumination system for supplying a light beam, an image display panel comprising an optically active material preceded by a first polarizer and succeeded by a second polarizer, and a projection lens system, wherein at least one of the two polarizers is implemented as the first or the second layer of a polarizing element as claimed in claim 13.

* * * * *